(12) United States Patent
Shibuya

(10) Patent No.: US 10,661,519 B2
(45) Date of Patent: May 26, 2020

(54) BEAD CORE FORMATION DEVICE

(71) Applicants: FUJI SEIKO CO., LTD., Hashima-shi, Gifu-ken (JP); FUJI SHOJI CO., LTD., Hashima-shi, Gifu-ken (JP)

(72) Inventor: Hidetoshi Shibuya, Hashima (JP)

(73) Assignees: FUJI SEIKO CO., LTD. (JP); FUJI SHOJI CO., LTD. (JP)

( * ) Notice: Subject to any disclaimer, the term of this patent is extended or adjusted under 35 U.S.C. 154(b) by 559 days.

(21) Appl. No.: 15/510,899

(22) PCT Filed: Sep. 17, 2014

(86) PCT No.: PCT/JP2014/074527
§ 371 (c)(1),
(2) Date: Mar. 13, 2017

(87) PCT Pub. No.: WO2016/042616
PCT Pub. Date: Mar. 24, 2016

(65) Prior Publication Data
US 2017/0282472 A1    Oct. 5, 2017

(51) Int. Cl.
*B29D 30/48* (2006.01)
*B65H 51/22* (2006.01)

(52) U.S. Cl.
CPC ........ *B29D 30/48* (2013.01); *B29D 2030/482* (2013.01); *B29D 2030/487* (2013.01); *B65H 51/22* (2013.01)

(58) Field of Classification Search
CPC .. B29D 30/48; B29D 2030/487; B65H 51/20; B65H 51/22; B65H 51/26; B29C 48/05;
(Continued)

(56) References Cited

U.S. PATENT DOCUMENTS 2,014,359 A  *  9/1935  Morrison ............... B29D 30/48
                                                152/540
4,754,794 A     7/1988  Bocquet et al.
(Continued)

FOREIGN PATENT DOCUMENTS

JP       3-148303 A      6/1991
JP     2002-538997 A    11/2002
(Continued)

OTHER PUBLICATIONS

International Preliminary Report on Patentability for Application No. PCT/JP2014/074527 dated Mar. 21, 2017.
(Continued)

*Primary Examiner* — Geofrey L Knable
(74) *Attorney, Agent, or Firm* — Tarolli, Sundheim, Covell & Tummino LLP

(57) ABSTRACT

A bead core formation apparatus includes a rubber coating device that coats a circumferential surface of a steel wire with rubber, and two cooling rollers around which the rubber-coated wire, which is a steel wire coated with rubber, is wound. The second roller includes a first groove and a second groove around which the rubber-coated wire located at a downstream side of the first groove is wound. The diameter LB of a portion including the second groove is smaller than the diameter LC of a portion including the first groove.

5 Claims, 5 Drawing Sheets

(58) Field of Classification Search
CPC ... B29C 48/154; B29C 48/911; B29C 48/914; B21C 49/00
See application file for complete search history.

(56) References Cited

U.S. PATENT DOCUMENTS

| | | | |
|---|---|---|---|
| 6,546,984 | B1 | 4/2003 | Golightly |
| 2014/0239115 | A1* | 8/2014 | Johnson ................. B65H 57/14 242/615.2 |

FOREIGN PATENT DOCUMENTS

| | | |
|---|---|---|
| JP | 2004-345312 A | 12/2004 |
| JP | 2011-207156 A | 10/2011 |

OTHER PUBLICATIONS

International Search Report for Application No. PCT/JP2014/074527 dated Dec. 22, 2014.

* cited by examiner

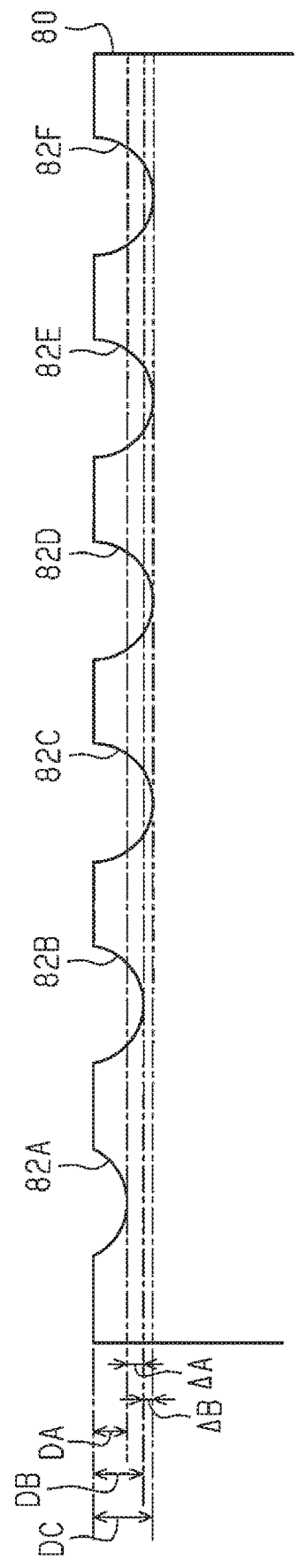

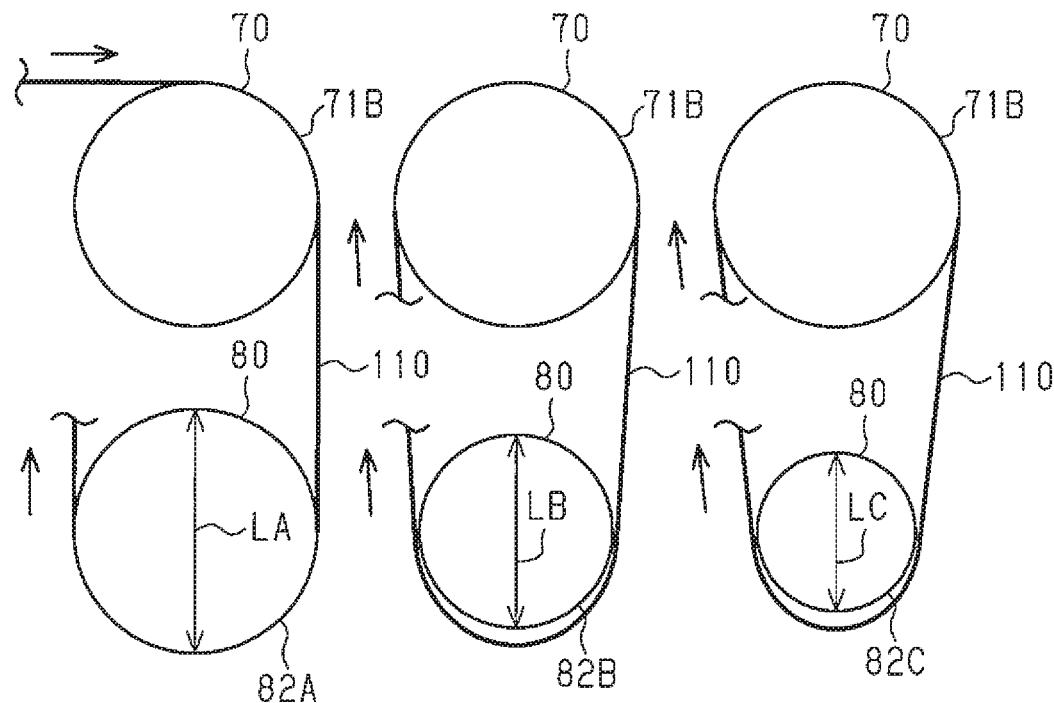
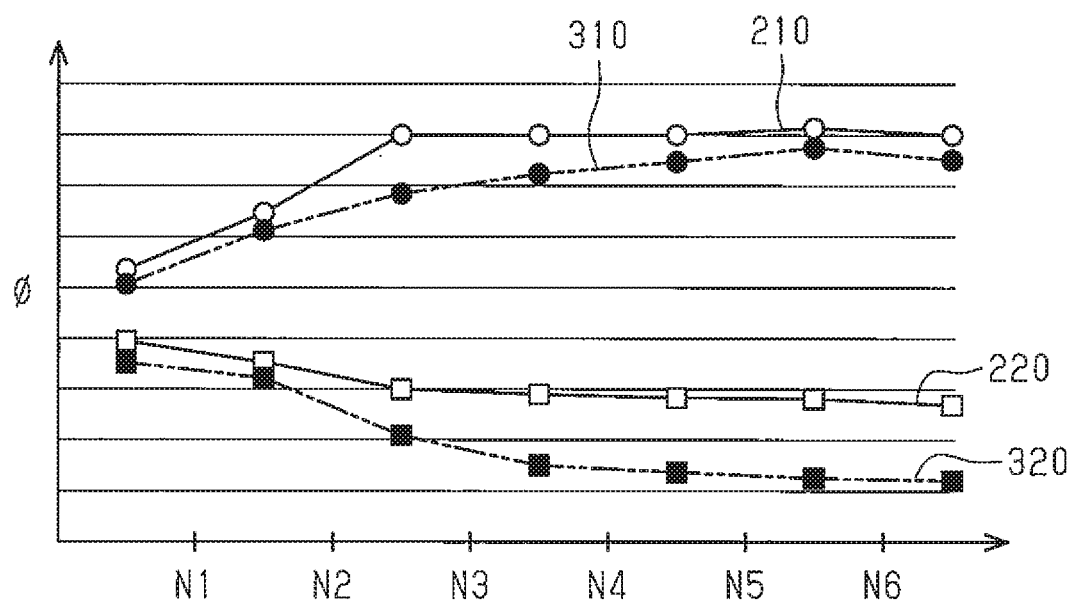

BEAD CORE FORMATION DEVICE

RELATED APPLICATIONS

The present invention is a U.S. National Stage under 35 USC 371 patent application, claiming priority to Serial No. PCT/JP2014/074527, filed on 17 Sep. 2014; the entirety of which is incorporated herein by reference.

TECHNICAL FIELD

The present invention relates to a bead core formation apparatus.

BACKGROUND ART

A bead core formation apparatus known in the art includes a device that coats a circumferential surface of a steel wire with rubber. For example, patent document 1 discloses a rubber coating device that has a heated steel wire contact rubber to heat and soften the rubber and apply the rubber to the circumferential surface of the steel wire. This coats the steel wire with the rubber. The steel wire, which is coated with the rubber, is wound around a winding drum and then sent to a former. This forms a bead core.

PRIOR ART DOCUMENT

Patent Document

Patent Document 1: Japanese Laid-Open Patent Publication No. 2004-345312

SUMMARY OF THE INVENTION

Problems that the Invention is to Solve

Immediately after coating the steel wire, the rubber has been softened by heat and thus easily deforms. Accordingly, when wound around the winding drum, the rubber may be squeezed and hardened. This may decrease the roundness of the rubber that coats the steel wire such that gaps easily form in the bead core. Further, this may result in the production of defective products.

Means for Solving the Problems

To achieve the above object, a bead core formation apparatus including a rubber coating device that coats a circumferential surface of a steel wire with rubber and cooling rollers around which the steel wire coated with rubber is wound. The cooling rollers each include a circumferential surface including a first groove and a second groove arranged in an axial direction of the corresponding cooling roller. The steel wire located at a downstream side of the first groove is wound around the second groove. In at least one of the cooling rollers, a portion including the second groove has a smaller diameter than a portion including the first groove.

In the above structure, the force applied to the portion of the steel wire wound around the second groove is smaller than the force applied to the portion of the steel wire wound around the first groove. This reduces the squeezed degree of the rubber and facilitates hardening of the rubber. Thus, decreases in the roundness of rubber that coats the steel wire are limited.

Effect of the Invention

The present bead core formation apparatus limits decreases in the roundness of rubber that coats a steel wire.

BRIEF DESCRIPTION OF THE DRAWINGS

FIG. 4 is a cross-sectional view showing grooves of a second cooling roller.

FIG. 5A is a schematic view showing the relationship of the cooling roller and a steel wire in an exaggerated manner.

FIG. 5B is a schematic view showing the relationship of the cooling roller and the steel wire in an exaggerated manner.

FIG. 5C is a schematic view showing the relationship of the cooling roller and the steel wire in an exaggerated manner.

FIG. 6 is a graph showing changes in the diameter of the steel wire wound around the cooling roller.

MODES FOR CARRYING OUT THE INVENTION

One embodiment of a bead core formation apparatus will now be described.

Figure 1:
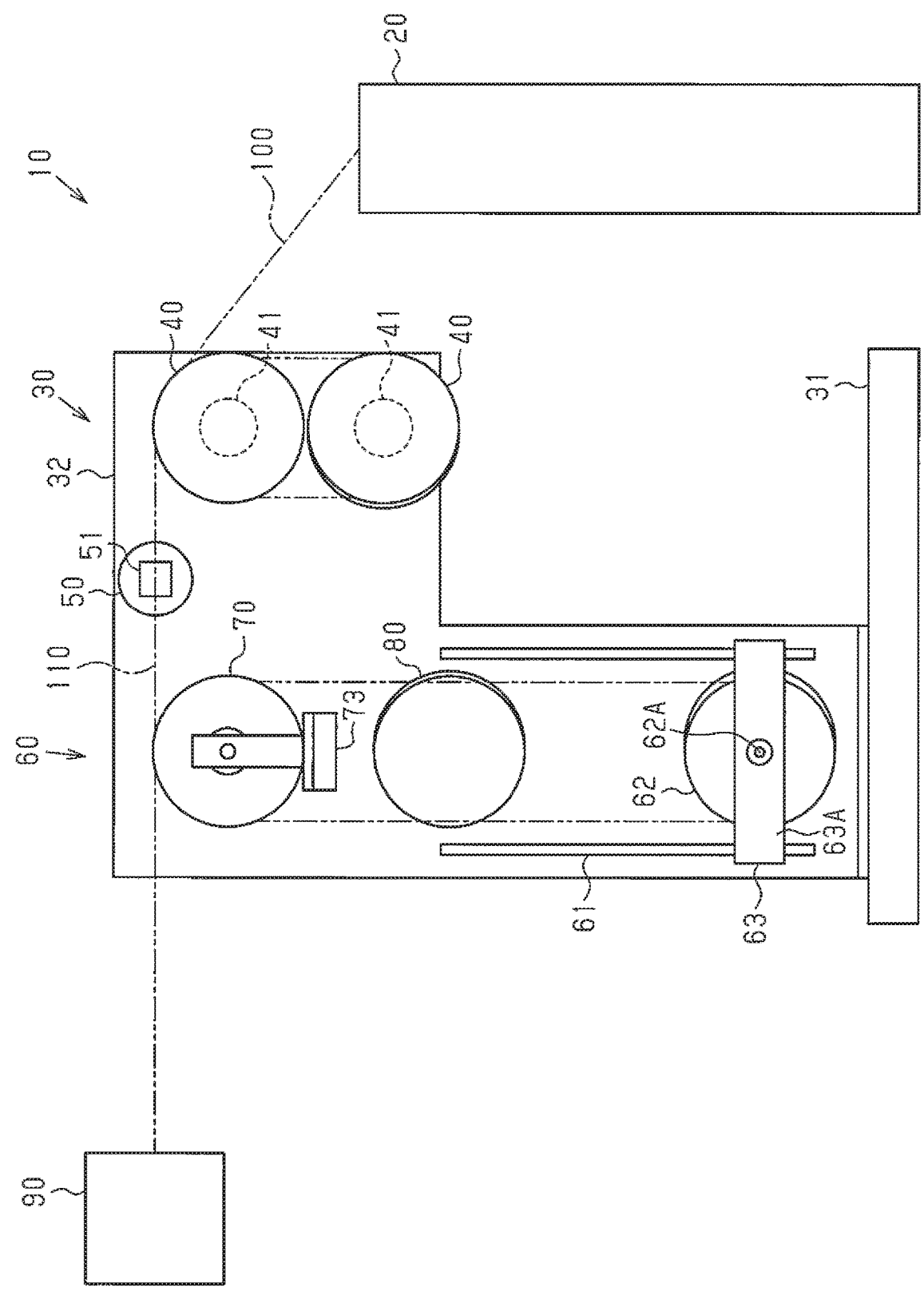
FIG. 1 is a front view showing a bead core formation apparatus according to one embodiment of the present invention.

As shown in FIG. 1, a bead core formation apparatus 10 includes a feed device 20 that feeds a steel wire 100, a rubber coating device 30 that coats the steel wire 100 with rubber, a festoon device 60 that adjusts tension on the steel wire 100, and a former 90. The former 90 forms a bead core by winding the steel wire 100 that has been coated with rubber.

The rubber coating device 30 includes a base 31, a support plate 32 projecting from the base 31, two heat transfer rollers 40, and an extrusion machine 50 that extrudes rubber onto the steel wire 100.

Rotation shafts 41 projecting from the support plate 32 are connected to the two heat transfer rollers 40, respectively. Each rotation shaft 41 is rotationally coupled to the support plate 32. The two heat transfer rollers 40 are arranged in the vertical direction of the support plate 32.

The steel wire 100 is fed from the feed device 20 and then wound around grooves (not shown) formed in circumferential surfaces of the two heat transfer rollers 40. The steel wire 100 runs around the two heat transfer rollers 40 a number of times and is then sent to the extrusion machine 50.

Heated water is supplied through the rotation shafts 41 into the heat transfer rollers 40. The heated water transfers heat to the heat transfer rollers 40. The steel wire 100 contacts the heat transfer rollers 40 and receives heat from the heat transfer rollers 40. Then, the steel wire 100 passes through a head 51 of the extrusion machine 50. The head 51 extrudes pre-vulcanized rubber onto the circumferential surface of the steel wire 100. The rubber is applied to the heated steel wire 100 and softened to coat the surface of the steel wire 100. The steel wire 100 coated with the rubber (hereinafter referred to as rubber-coated wire 110) is sent to the festoon device 60.

Figure 2:
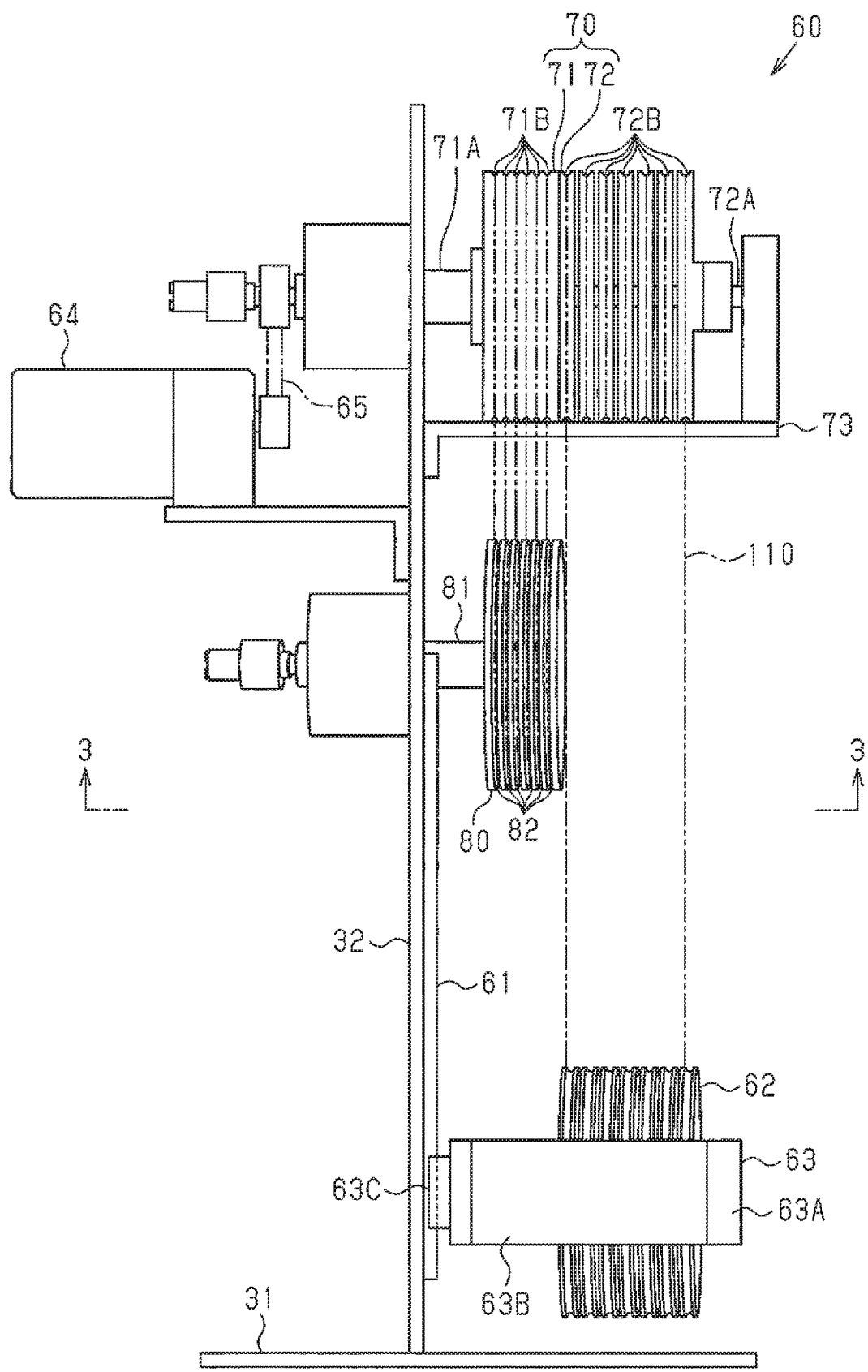
FIG. 2 is a side view showing a festoon device.

As shown in FIG. 2, the festoon device 60 includes an upper roller 70 and a second cooling roller 80 that are coupled to the support plate 32. The two rollers 70 and 80 are arranged in the vertical direction of the support plate 32.

A rotation shaft 71A projecting from the support plate 32 is connected to the upper roller 70. The rotation shaft 71A is rotationally coupled to the support plate 32. The upper roller 70 includes a first cooling roller 71, to which the rotation shaft 71A is connected, and a base roller 72, which is located farther from the support plate 32 than the first cooling roller 71.

The first cooling roller 71 is a single component. The first cooling roller 71 has a circumferential surface including grooves 71B. The grooves 71B are arranged in the axial direction of the cooling roller 71. The base roller 72 is separate from the first cooling roller 71. The base roller 72 includes disk members arranged in the axial direction of the base roller 72. Each of the disk members is coupled to a shaft 72A fixed to a front surface of the first cooling roller 71. Each disk member has a circumferential surface including a single groove 72B. That is, the base roller 72 includes multiple grooves 72B arranged in the axial direction. A plate-shaped bracket 73 coupled to the support plate 32 is arranged below the upper roller 70. The shaft 72A includes a front end that is rotationally supported by the bracket 73. The first cooling roller 71 rotates with the rotation shaft 71A. Each disk member of the base roller 72 is rotatable about the shaft 71A and is thus rotatable relative to the first cooling roller 71.

A rotation shaft 81 projecting from the support plate 32 is connected to the second cooling roller 80. The rotation shaft 81 is rotationally coupled to the support plate 32. The second cooling roller 80 has a circumferential surface including grooves 82. The grooves 82 are arranged in the axial direction of the second cooling roller 80. The axial direction of the second cooling roller 80 is inclined with respect to the axial direction of the first cooling roller 71. In this case, in the second cooling roller 80, a terminal end (lower end in FIG. 3) of the rubber-coated wire 110 wound around the grooves 82 is opposed to the groove 71B that is adjacent toward the front of the groove 71B corresponding to an initial end (upper end in FIG. 3) of the rubber-coated wire 110 wound around the grooves 82.

The festoon device 60 includes a motor 64. The motor 64 is connected to the rotation shaft 71A by a belt 65. The motor 64 rotates the rotation shaft 71A and the first cooling roller 71. This winds the rubber-coated wire 110 around the first cooling roller 71.

Figure 3:
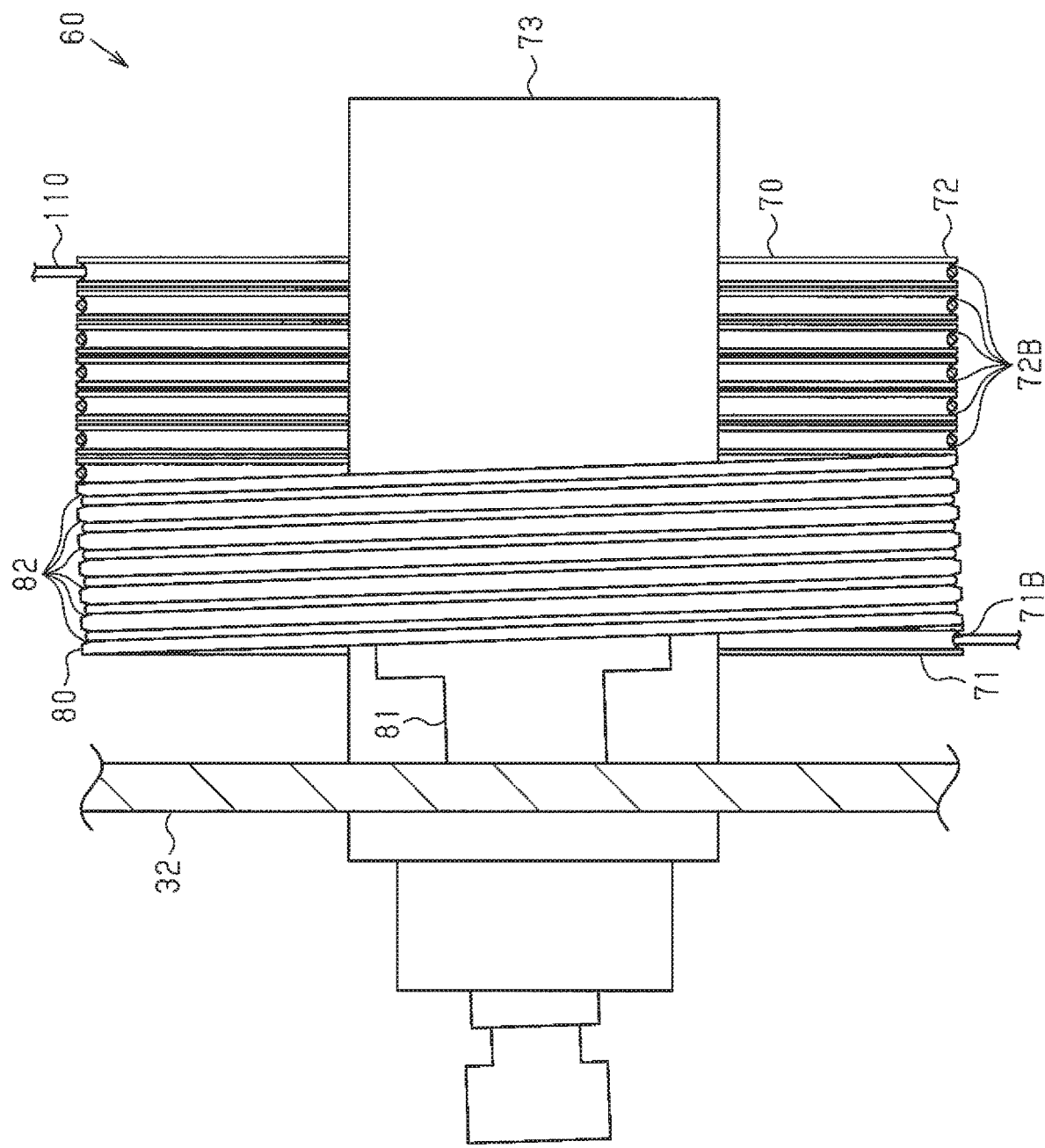
FIG. 3 is a cross-sectional view taken along line 3-3 in FIG. 2.

The rubber-coated wire 110 runs around the first cooling roller 71 and the second cooling roller 80. More specifically, as shown in FIG. 3, the rubber-coated wire 110 is wound around the rearmost groove 71B of the first cooling roller 71. Then, the rubber-coated wire 110 is wound around the rearmost groove 82 of the second cooling roller 80 and rewound around a groove 71B of the first cooling roller 71. As described above, the grooves 82 of the second cooling roller 80 are inclined with respect to the grooves 71B of the first cooling roller 71. Thus, when the rubber-coated wire 110 is wound around a groove 82 of the second cooling roller 80 and then rewound around the first cooling roller 71, the rubber-coated wire 110 is wound around the groove 71B that is adjacent toward the front of the groove 71B around which the steel wire 100 was previously wound. In this state, the rubber-coated wire 110 extends in the vertical direction between the first cooling roller 71 and the second cooling roller 80. Thus, the rubber-coated wire 110 is not twisted between the first cooling roller 71 and the second cooling roller 80. In this manner, the rubber-coated wire 110 is sequentially wound from the rear toward the front around the grooves 71B of the first cooling roller 71 and the grooves 82 of the second cooling roller 80.

As shown in FIG. 2, after the rubber-coated wire 110 is wound around the frontmost groove 71B of the first cooling roller 71, the rubber-coated wire 110 is sent to an adjustment roller 62. The adjustment roller 62 is located below the upper roller 70. The rubber-coated wire 110 runs around the cooling rollers 71 and 80 a number of times and then runs around the base roller 72 and the adjustment roller 62 a number of times.

The adjustment roller 62 is coupled to the support plate 32 by a weight 63. The weight 63 includes a front plate 63A covering the front surface of the adjustment roller 62 and two side plates 63B covering the two side surfaces of the adjustment roller 62. Each of the side plates 63B includes a rear end including a slider 63C. The slider 63C is coupled to the support plate 32 by a rail 61 extending in the vertical direction. The height of the upper end of the rail 61 is equal to the height of the second cooling roller 80. As shown in FIG. 1, the adjustment roller 62 is coupled to the front plate 63A by a fixed shaft 62A. The adjustment roller 62 is rotationally coupled to the fixed shaft 62A. The adjustment roller 62 is movable relative to the rail 61 in the vertical direction in accordance with the tension on the rubber-coated wire 110 and the weight of the weight 63. The adjustment roller 62 rises to the same height as the second cooling roller 80. The feed device 20 sends the steel wire 100 to the rubber coating device 30 at a constant speed. When a predetermined amount of the rubber-coated wire 110 is wound around the former 90, the former 90 temporarily stops winding the rubber-coated wire 110. During the period in which the former 90 is stopping the winding of the rubber-coated wire 110, the rubber-coated wire 110 is removed from the former 90. The festoon device 60 adjusts the length of the rubber-coated wire 110 wound around the base roller 72 and the adjustment roller 62 to adjust the amount of the rubber-coated wire 110 sent from the rubber coating device 30 and the amount of the rubber-coated wire 110 sent to the former 90.

Fluid such as a coolant is supplied through the rotation shafts 71A and 81 into the first cooling roller 71 and the second cooling roller 80 shown in FIG. 2. The fluid cools the cooling rollers 71 and 80. Thus, when the rubber-coated wire 110 runs around the first cooling roller 71 and the second cooling roller 80, the rubber applied to the rubber-coated wire 110 is cooled to, for example, 20° C. and hardened.

As shown in FIG. 4, the grooves 82 in the circumferential surface of the second cooling roller 80 include a first groove 82A, a second groove 82B, a third groove 82C, a fourth groove 82D, a fifth groove 82E, and a sixth groove 82F from the rear end of the second cooling roller 80 to the front end of the second cooling roller 80. The grooves 82A to 82F have the same curvature.

The depth DB of the second groove 82B is greater than the depth DA of the first groove 82A. The grooves 82C to 82F have the same depth DC that is greater than the depth DB of the second groove 82B. Further, the difference AB between the depth DB of the second groove 82B and the depth DC of the third groove 82C is smaller than the difference AA between the depth DA of the first groove 82A and the depth DB of the second groove 82B.

As shown in FIG. 5, the diameter of the second cooling roller 80 decreases in order from the portion including the first groove 82A and having a first diameter LA, the portion including the second groove 82B and having a second diameter LB, and the portion including the third grooves 82C to 82F and having a third diameter LC. The difference between the second diameter LB and the third diameter LC is smaller than the difference between the first diameter LA and the second diameter LB.

The operation of the rubber coating device 30 will now be described with reference to FIGS. 4 and 5. FIG. 5 shows slack in the rubber-coated wire 110 on the second rolling roller 80 in an exaggerated manner.

Immediately after having coated the rubber-coated wire 110, the rubber has been softened by heat. Thus, when the rubber-coated wire 110 contacts the first cooling roller 71 and the second cooling roller 80, force applied to the rubber coating the rubber-coated wire 110 squeezes the rubber.

As shown in FIGS. 5A and 5B, the second diameter LB is smaller than the first diameter LA in the second cooling roller 80. Thus, the portion of the second cooling roller 80 including the second groove 82B moves more slowly than the portion of the second cooling roller 80 including the first groove 82A. Further, the elasticity of the rubber-coated wire 110 allows the rubber-coated wire 110 to be bent in a state partially separated from the second cooling roller 80. This loosens the portion of the rubber-coated wire 110 wound around the second groove 82B. Accordingly, the force that presses the rubber-coated wire 110 wound around the second groove 82B against the bottom surface of the second groove 82B is smaller than the force that presses the rubber-coated wire 110 wound around the first groove 82A against the bottom surface of the first groove 82A. Thus, after the rubber wound around the first groove 82A cools and hardens to a certain extent, the squeezed degree of the rubber wound around the second groove 82B is reduced.

As shown in FIGS. 5B and 5C, the third diameter LC is smaller than the second diameter LB in the second cooling roller 80. Thus, the portion of the second cooling roller 80 including the third groove 82C moves more slowly than the portion of the second cooling roller 80 including the second groove 82B. This loosens the portion of the rubber-coated wire 110 wound around the third groove 82C. Accordingly, the force that presses the rubber-coated wire 110 wound around the third groove 82C against the bottom surface of the third groove 82C is smaller than the force that presses the rubber-coated wire 110 wound around the second groove 82B against the bottom surface of the second groove 82B. Thus, after the rubber wound around the second groove 82B cools and hardens to a certain extent, the squeezed degree of the rubber wound around the third groove 82C is reduced.

EXAMPLE

An example will now be described with reference to FIG. 6.

Two cooling rollers of the example have circumferential surfaces including six grooves N1 to N6. The two cooling rollers of the example have the same structure as the second cooling roller 80 except for the six grooves N1 to N6. The second to sixth grooves N2 to N6 of each of the cooling rollers of the example have a greater depth than the first groove N1. Solid line 210 in FIG. 6 shows the maximum diameter φX of portions of the rubber-coated wire 110 wound around the two cooling rollers of the example that have passed through the grooves N2 to N6. Solid line 220 shows the minimum diameter φY of portions of the rubber-coated wire 110 wound around the cooling rollers of the example that have passed through the grooves N2 to N6. The maximum diameter φX indicates the diameter φ of a portion of the rubber-coated wire 110 where the diameter φ is the largest in cross section. The minimum diameter φY indicates the diameter φ of a portion of the rubber-coated wire 110 where the diameter φ is the smallest in cross section.

Two cooling rollers of a comparative example have circumferential surfaces including six grooves N1 to N6. The two cooling rollers of the comparative example have the same structure as the second cooling roller 80 except for the six grooves N1 to N6. The first to sixth grooves N1 to N6 of each of the cooling rollers of the comparative example have the same depth. Broken line 310 in FIG. 6 shows the maximum diameter φA of portions of the rubber-coated wire 110 wound around the two cooling rollers of the comparative example that have passed through the grooves N2 to N6. Broken line 320 shows the minimum diameter φB of portions of the rubber-coated wire 110 wound around the cooling rollers of the comparative example that have passed through the grooves N2 to N6. The maximum diameter φA indicates the diameter φ of a portion of the rubber-coated wire 110 where the diameter φ is the largest in cross section. The minimum diameter φB indicates the diameter φ of a portion of the rubber-coated wire 110 where the diameter φ is the smallest in cross section.

As shown by broken line 310, the maximum diameter φA of the comparative example gradually increases as the rubber-coated wire 110 passes through the grooves N1 to N6. As shown by broken line 320, the minimum diameter φB gradually decreases as the rubber-coated wire 110 passes through the grooves N1 to N6. That is, as the rubber-coated wire 110 passes through the grooves N1 to N6, the difference between the maximum diameter φA and the minimum diameter φB gradually increases and decreases the roundness. In particular, the amount of change in the maximum diameter φA and the minimum diameter φB when the rubber-coated wire 110 passes through the first to third grooves N1 to N3 is larger than the amount of change in the maximum diameter φA and the minimum diameter φB when the rubber-coated wire 110 passes through the fourth to sixth grooves N4 to N6.

As shown by solid line 210, the maximum diameter φX of the example increases as the rubber-coated wire 110 passes through the grooves N1 to N6. As shown by solid line 220, the minimum diameter φY increases decreases as the rubber-coated wire 110 passes through the grooves N1 to N6.

From the first groove N1 to the sixth groove N6, the amount of change in the maximum diameter φX of the example is substantially equal to the amount of change in the maximum diameter φA of the comparative example. From the first groove N1 to the sixth groove N6, the amount of change in the minimum diameter φY of the example is smaller than the amount of change in the minimum diameter φB of the comparative example. More specifically, from the first groove N1 to the second groove N2, the amount of change in the minimum diameter φY of the example is substantially equal to the amount of change in the minimum diameter φB of the comparative example. From the second groove N2 to the third groove N3, the amount of change in the minimum diameter φY of the example is smaller than the amount of change in the minimum diameter φB of the comparative example. From the third groove N3 to the fourth groove N4, the amount of change in the minimum diameter φY of the example is smaller than the amount of change in the minimum diameter φB of the comparative example. From when the rubber-coated wire 110 passes through the fourth groove N4 to when the rubber-coated wire 110 passes through the sixth groove N6, the amount of change in the minimum diameter φY of the example and the amount of change in the minimum diameter φB of the comparative example are small.

Thus, after the rubber-coated wire 110 passes through the sixth groove N6, the difference between the maximum diameter φX and the minimum diameter φY of the example is smaller than the difference between the maximum diameter φA and the minimum diameter φB of the comparative example. Thus, decreases in the roundness are limited in the rubber of the rubber-coated wire 110 that passes through the two cooling rollers of the example as compared to the rubber of the rubber-coated wire 110 that passes through the two cooling rollers of the comparative example.

The embodiment has the advantages described below.

(1) The diameter LB of the portion of the second cooling roller 80 including the second groove 82B is smaller than the diameter LA of the portion of the second cooling roller 80 including the first groove 82A. This reduces the force applied to the portion of the rubber-coated wire 110 wound around the second groove 82B and reduces the squeezed degree of the rubber coating the rubber-coated wire 110. Thus, decreases in the roundness of rubber that coats the rubber-coated wire 110 are limited.

(2) The diameter LC of the portion of the second cooling roller 80 including the third groove 82C is smaller than the diameter LB of the portion of the second cooling roller 80 including the second groove 82B. This reduces the force applied to the portion of the rubber-coated wire 110 wound around the third groove 82C and reduces the squeezed degree of rubber. Thus, decreases in the roundness of rubber that coats the rubber-coated wire 110 are further limited.

(3) When the tension applied to the rubber-coated wire 110 is reduced, the squeezed degree of the rubber decreases. However, since the tension applied to the rubber-coated wire 110 decreases, the area of the rubber contacting the second cooling roller 80 decreases. This may lower the rubber cooling effect.

The difference between the diameter LB of the portion including the second groove 82B and the diameter LC of the portion including the third groove 82C is smaller than the difference between the diameter LA of the portion including the first groove 82A and the diameter LB of the portion including the second groove 82B. Thus, the tension on the rubber-coated wire 110 wound around the third groove 82C is larger than the tension on the rubber-coated wire 110 wound around the second groove 82B. This limits decreases in the roundness of the rubber-coated wire 110 coated with rubber while limiting decreases in the rubber cooling performance of the third groove 82C.

(4) For example, in a bead core formation apparatus, the extrusion machine 50 and a festoon device that is in contact with the rubber-coated wire 110 may be spaced apart from each other by a predetermined distance. In such a bead core formation apparatus, rubber that coats the rubber-coated wire 110 is not in contact with other members until the rubber sufficiently cools and hardens. Thus, the rubber resists squeezing. This limits decreases in the roundness of the rubber that coats the rubber-coated wire 110. However, the space between the extrusion machine 50 and the festoon device will increase and enlarge the bead core formation apparatus.

In this regard, the rubber coating device 30 and the festoon device 60 are coupled to the same support plate 32 in the bead core formation apparatus 10. This reduces the space occupied by the bead core formation apparatus 10 while limiting decreases in the roundness of the rubber-coated wire 110 coated with rubber.

(5) In the festoon device 60, the first cooling roller 71 that cools the rubber-coated wire 110 and the base roller 72 that adjusts the fed amount of the rubber-coated wire 110 are arranged in the axial direction. This reduces the bead core formation apparatus 10 in size.

(6) The third to sixth grooves 82C to 82F have the same depth. Thus, as compared to when the third to sixth grooves 82C to 82F have different depths, the second cooling roller 80 is easier to machine. Further, as compared to when the fourth to sixth grooves 82D to 82F have a larger depth than the third groove 82C, the rubber-coated wire 110 wound around the fourth to sixth grooves 82D to 82F is strongly pressed against the bottom surfaces of the fourth to sixth grooves 82D to 82F. This increases the area of the rubber that comes into contact with the bottom surface of each of the fourth to sixth grooves 82D to 82F. Thus, decreases in the rubber cooling effect of the rubber-coated wire 110 are limited.

The above embodiment may be modified as follows.

The second cooling roller 80 may include a plurality of first grooves 82A. More specifically, the first grooves 82A are arranged in the axial direction of the cooling roller 80, and the second groove 82B is located at the front side of the first grooves 82A. Even in this case, the portion of the rubber-coated wire 110 wound around the second groove 82B loosens and limits decreases in the roundness of rubber of the rubber-coated wire 110.

A plurality of second grooves 82B may be formed. More specifically, the second grooves 82B are arranged in the axial direction of the cooling roller 80 and located between the first groove 82A and the third groove 82C.

In the second cooling roller 80, the third diameter LC may be equal to the second diameter LB.

The third to sixth grooves 82C to 82F of the second cooling roller 80 may have different depths. For example, the third groove 82C, the fourth groove 82D, the fifth groove 82E, and the sixth groove 82F may deepen in this order.

The difference between the second diameter LB and the third diameter LC may be greater than or equal to the difference between the first diameter LA and the second diameter LB.

The grooves 71B of the first cooling roller 71 may have the same depth as the grooves 82A to 82F of the second cooling roller 80.

There may be three or more cooling rollers. For example, when three cooling rollers are arranged, the rubber-coated wire 110 may be wound around the three cooling rollers so that the rubber-coated wire 110 runs around the three cooling rollers. In this case, when the second groove of at least one of the cooling rollers has a greater depth than the first groove located at the upstream side of the second groove, decreases in the roundness of rubber of the rubber-coated wire 110 are limited.

A heater may be changed to an electromagnetic induction coil that directly heats the rubber-coated wire 110.

Heated rubber may be extruded from the extrusion machine 50. Further, a heater that directly heats extruded rubber may be employed. In this case, the heater may be omitted.

The cooling rollers 71 and 80 may be cooled by a cooler that reduces the temperatures in the cooling rollers 71 and 80.

DESCRIPTION OF THE REFERENCE NUMERALS

10 . . . Bead Core Formation Apparatus, 30 . . . Rubber Coating Device, 62 . . . Adjustment Roller, 71 . . . First Cooling Roller, 71B . . . Groove, 72 . . . Base roller, 80 . . . Second Cooling Roller, 82 . . . Groove, 82A . . . First Groove, 82B . . . Second Groove, 82C . . . Third Groove, 100 . . . Steel Wire

The invention claimed is:

1. A bead core formation apparatus comprising:
a rubber coating device that coats a circumferential surface of a steel wire with rubber; and
cooling rollers around which the steel wire coated with rubber is wound, wherein
the cooling rollers include a first cooling roller and a second cooling roller, each have a circumferential surface including a first groove and a second groove arranged in an axial direction of the corresponding cooling roller,
the steel wire located at a downstream side of the first groove of the second cooling roller is wound around the second groove of the second cooling roller, and
the second groove of the second cooling roller has a smaller diameter than the first groove of the second cooling roller by making a depth of the second groove greater than a depth of the first groove.

2. The bead core formation apparatus according to claim 1, wherein
the circumferential surface of at least one of the cooling rollers includes a third groove around which the steel wire located at a downstream side of the second groove is wound, and
in the at least one of the cooling rollers, a portion including the third groove has a smaller diameter than the portion including the second groove.

3. The bead core formation apparatus according to claim 2, wherein
a difference between the diameter of the portion including the second groove and the diameter of the portion including the third groove is smaller than a difference between the diameter of the portion including the first groove and the diameter of the portion including the second groove.

4. The bead core formation apparatus according to claim 1, comprising a festoon device, wherein
the rubber coating device and the festoon device are coupled to the same support plate.

5. The bead core formation apparatus according to claim 4, wherein
the festoon device includes an adjustment roller movable relative to the support plate and a base roller that does not move relative to the support plate, and
the base roller and one of the cooling rollers are arranged in the axial direction.

* * * * *